Nov. 3, 1964 W. T. HARDISON ETAL Re. 25,674
VARIABLE RESISTOR DEVICE
Original Filed June 26, 1961 2 Sheets-Sheet 1
FIG. 1.
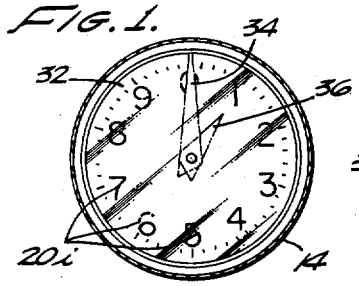
FIG. 2.
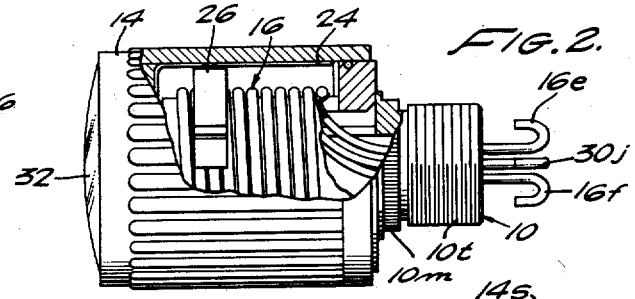
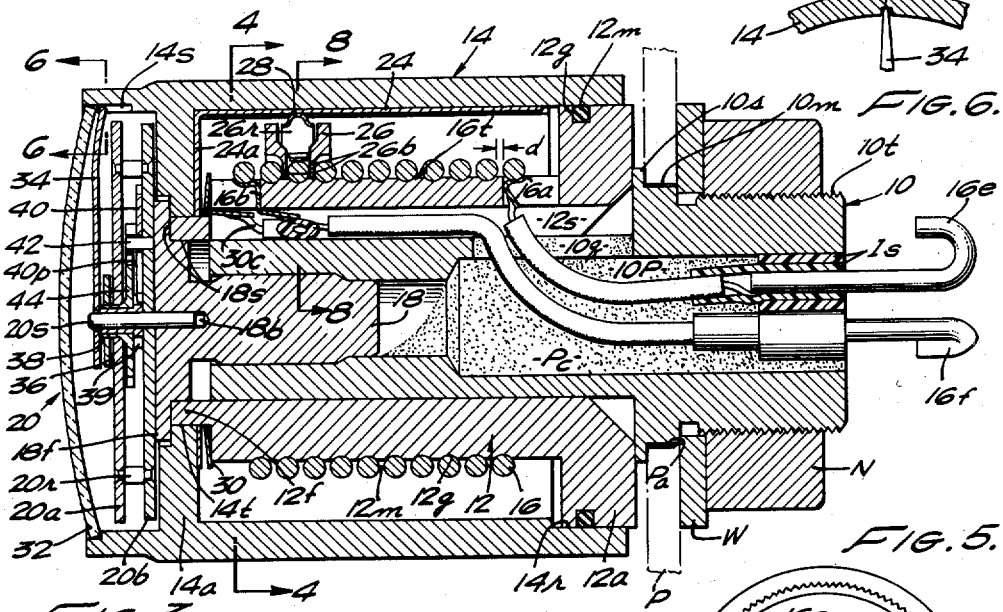
FIG. 3.
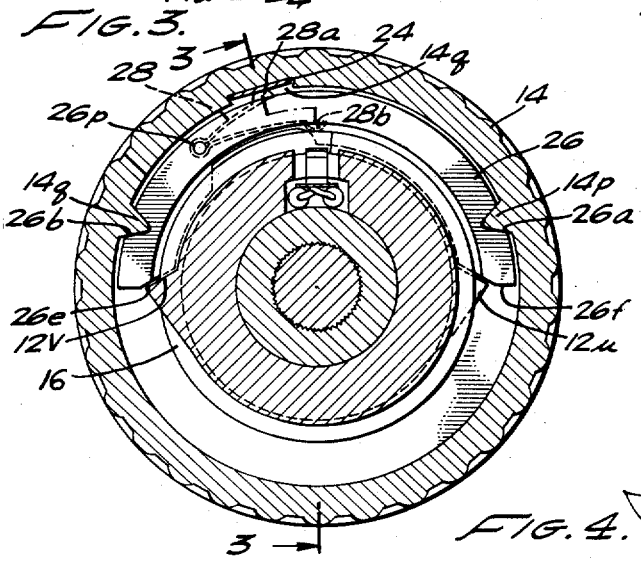
FIG. 4.
FIG. 5.
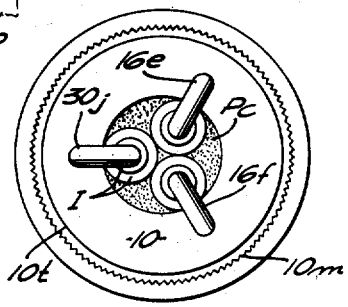
FIG. 6.
WILBUR T. HARDISON
VICTOR G. MATHISON
RICHARD E. CADDOCK
MARLAN E. BOURNS
INVENTORS
BY

VARIABLE RESISTOR DEVICE

Original Filed June 26, 1961 2 Sheets-Sheet 2

WILBUR T. HARDISON
VICTOR G. MATHISON
RICHARD E. CADDOCK
MARLAN E. BOURNS
INVENTORS

BY

United States Patent Office

Re. 25,674
Reissued Nov. 3, 1964

25,674

VARIABLE RESISTOR DEVICE

Wilbur T. Hardison, Victor G. Mathison, Richard E. Caddock, and Marlan E. Bourns, all of Riverside, Calif., assignors to Bourns, Inc.

Original No. 3,069,646, dated Dec. 18, 1962, Ser. No. 119,608, June 26, 1961. Application for reissue Dec. 4, 1963, Ser. No. 337,118
26 Claims. (Cl. 338—143)

Matter enclosed in heavy brackets [ ] appears in the original patent but forms no part of this reissue specification; matter printed in italics indicates the additions made by reissue.

This invention pertains to adjustable electrical resistor devices and more particularly to variable resistor devices of the potentiometer type comprising a helical resistance element of a plurality of turns of convolutions.

It is know in the prior art to form a resistance element by winding a large number of spaced turns of resistance wire on an insulated rod or mandrel and to form the rod or mandrel into a helix affixed to the surface of a threaded cylindrical support, thus providing a resistance element of a form identified in the classified arts as a compound helix (see Class 338, subclass 298, Patent Office Manual of Classification, for example, and the definitions in Classification Bulletin No. 430, Class 338, Electrical Resistors). An exposed surface of the resistance wire was thus disposed for contact by a rotatable and translatable contact device, whereby through electrical connections a variable portion of the resistance of the wire was made effective between terminals or in an external electrical circuit. In some of the prior art devices of the class here concerned, the helical resistance element is affixed to the exterior of a rotatable cylindrical shaft-mounted member and the contact device is mounted for longitudinal motion inside a cylindrical housing enclosing the movable parts. In other prior art devices of that class, the helical resistance element is mounted in a groove formed in the interior cylindrical surface of a fixed housing, and the contact device is rotated and translated by rotation of shaft means in the housing. The prior art potentiometers of the class described are arranged for mounting against the rear face of a panel, with a tubular mounting stud and adjusting shaft extending through an aperture in the panel for operation by dial or knob means secured to the protruding end of the shaft. Examples of prior-art devices of the class concerned are illustrated in U.S. patents to Erb, 2,371,-159, to Van Dyke, 2,558,326 and to Puerner, 2,399,060.

Also it is known in the prior art to provide dial indicator means for furnishing indications of adjustments of the device and/or approximate values of resistance exhibited between terminals. Examples of devices of that class are illustrated in the patents to Rochat, 1,842,842, and to George, 2,539,575.

It is to improvements in the aforementioned generally defined class or classes of instruments that the present invention is directed. The invention comprehends a helical-element potentiometer of rather small size (approximately 0.75" diameter x 0.875 body length in a "ten-turn" instrument, for example), in which substantially no more than a single mounting-stud nut and terminal leads appear at the rear of the mounting panel and with all of the operating parts, including full turns and fraction-of-turn dial indicated means, disposed within a rotatable shell or knob disposed at the front face of the mounting panel. Thus an instrument according to the invention permits utilization of substantially all of the interior space in a cabinet or rack for associated equipment and utilizes the otherwise wasted space within the actuating knob for housing the operating electrical components of the potentiometer. Briefly, a potentiometric device according to the invention comprises essentially a mounting stud adapted to be secured in an aperture in a panel and having a passage through at least the rear portion thereof through which electrical connections extend. The stud has affixed to a forwardly extending portion thereof a generally cylindric support upon a helically grooved exterior surface of which a helical resistance element is secured. The successive turns or convolutions of the resistance element coil are spaced apart a slight distance, to form a helical groove or track. A rotatable slider, comprising an electrical contact arranged to bear at one of its ends against the resistance element, is provided with a pair of inwardly extending fins or runners which engage in the groove or track and cause longitudinal translation or migration of the slider and contact as the slider is rotated around the element coil. The electrical contact, having inner and outer contact points, is constructed and arranged to slide along the exposed surface of the resistance element to establish a variable connection with the element. A generally cylindric outer shell or cover is supported for rotation upon the stationary coil-bearing support, and has longitudinally extending flutes or milling to facilitate manual rotation, and a pair of ribs or V-ways on its inner surface that engage in complementary notch in the slider for driving the slider as the shell is rotated. An electrical collector or bus bar is disposed longitudinally along the interior surface of the shell, in position to be engaged by the outer contact point of the slider contact irrespective of the instant position of the slider along the length of the resistance element. The bus bar or collector has a ring-shaped extension at its forward end, that serves as a slip ring for electrical communication with stationary brush means mounted on the stationary inner structure. Respective electrical leads are secured to the brush means and the ends of the resistance coil, and extend through and are sealed in the stationary hollow interior of the support to an exposed location at the rear of a mounting panel. Thus as the shell in which the operating parts are housed is rotated, variation is effected in the value of electrical resistance exhibited between the bus bar lead and either (or both) of the other terminal leads.

While not essential in all applications of the previously described portion of the invention, there is provided in the preferred embodiment of the invention, novel indicating means providing a visually-perceptible indication of the amount of resistance (by proportion) connected between the bus bar lead and a selected one of the other terminals of the instrument. Thus the device according to the invention is an instrument that is readily mounted on the front face of a panel by means requiring but a single aperture in the panel, that saves space and material by enclosing the operating parts in the knob by which instruments of its class are normally actuated, that provides an easily read indicator, and that presents many other improvement over prior art as will later herein be explained.

It is, then, a principal object of the invention to provide improvements in variable resistors.

A second object of the invention is to provide a potentiometric device adapted for panel mounting and requiring but a single mounting aperture in a panel, with the electrical connections available at the rear face of the panel, and occupying substantially no space at the rear of the panel.

Another object of the invention is to provide a simple helical-element knob-enclosed variable resistor having a minimum of parts.

An additional object of the invention is to provide a simple panel-mounted helical-element potentiometric device having means providing an easily discerned indication of the number of whole turns and of the fraction of a turn of the element that are electrically connected between terminals.

A further object of the invention is to provide a helical-element potentiometric device that occupies a minimum of space.

Other objects and advantages of the invention will hereinafter become apparent upon consideration of the following descriptions, or will be made evident in the appended claims. The descriptions are of a principal preferred embodiment of a potentiometric device according to the invention and a modification thereof, both illustrated in the accompanying drawings forming a part of this specification, and in which drawings:

FIG. 1 is a face view of a preferred form of device according to the invention enlarged to the order of two times normal size;

FIG. 2 is a side view of the device illustrated in FIG. 1, with a portion broken away.

FIG. 3 is a longitudinal sectional view on an enlarged scale, taken as indicated by line 3—3 of FIG. 4, illustrating the mode of mounting of the preferred embodiment of the device on a panel and illustrating details of construction;

FIG. 4 is a transverse sectional view taken as indicated by line 4—4 of FIG. 3, illustrating the contact-bearing slider and contact member, and indicating the means for driving and the means for stopping the slider at opposite extremes of travel;

FIG. 5 is a fragmentary end view of the device illustrated in FIG. 2, illustrating the electrical terminals and mode of sealing the terminals;

FIG. 6 is a fragmentary sectional view taken as indicated by line 6—6 of FIG. 3;

Figure 7:
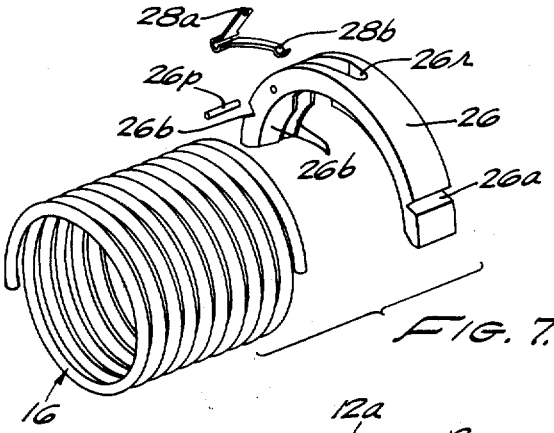
FIG. 7 is a representation of parts in disassembled array, on a convenient scale.

Referring now to FIG. 3, a supporting stud indicated generally by ordinal 10 is illustrated as having a threaded tubular rear portion 10t and forwardly thereof a short milled or knurled portion 10m with an adjacent shoulder flange 10s. The milled portion is of somewhat larger diameter than the threaded portion and is adapted to form a light interference fit with the wall of an aperture Pa formed in a supporting panel P. Thus the stud is adapted to be held against rotation in the aperture and to be firmly secured to the panel by means including a washer W and a nut N, as indicated. Mounted on the generally cylindrical portion of stud 10 forwardly of flange 10s is a preferably electrically insulative support denoted generally by ordinal 12. Support 12 is of generally cylindric and tubular formation, and has a flange portion 12a of a relatively large diameter at the rear end and a portion 12f of relatively small diameter at its front end. The support is suitably affixed to stud 10, as by adhesive disposed at the contacting surfaces of the two members, and thereby the support becomes a relatively stationary component of the device. The cylindrical surfaces of front and rear portions 12f and 12a of support 12 provide bearing surfaces for supporting for rotation thereon a generally cylindrical cover or shell 14. The shell has supplementary internal cylindrical front and rear bearing surfaces 14t, 14r, respectively, rotatively bearing on portions 12f and 12a, the front bearing surface 14t being formed on an inwardly projecting flange 14a.

Figure 8:
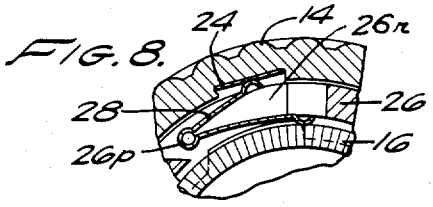
FIG. 8 is a fragmentary sectional view taken as indicated by line 8—8 of FIG. 3.
Figure 11:
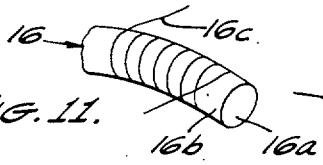
FIG. 11 is a magnified fragmentary view of a portion of a resistance element.

The external periphery of the middle portion 12m of support 12 is preferably provided with a shallow helical groove 12g, in which is seated a helical resistance element 16. The resistance element (FIGS. 8 and 11) comprises a core 16a which may conveniently be formed of soft copper wire, the core being insulated either by virtue of its composition or by a coating or jacket 16b of insulating composition such as synthetic resin. The insulated core of the element bears resistive material 16c which in the illustrated embodiment of the invention is a helical winding of resistance wire. The convolutions of resistance wire are either spaced-apart or otherwise insulated each from next-adjacent turns. The resistance element 16 is adhesively secured to support 12 and is, as indicated in FIG. 3, arranged with next-adjacent turns or coils spaced-apart by a selected distance d, whereby there is in effect, provided by the element or coil 16 a helical thread having a groove 16t. The groove performs a determined function, as is hereinafter explained.

Press-fitted into the interior of the tubular front end or forward portion of supporting stud 10 is a flanged plug 18 that is provided with a peripheral shoulder 18s serving to assist the front end of support 12 in carrying shell 14. plug 18 further has a flange 18f which, as indicated, serves to coact with flange 14a of the shell 14 to maintain the shell on the stationary support. Plug 18 is provided at its front end with a bore 18b for reception of a pin 20s of an indicator assembly designated generally by ordinal 20. The indicator assembly includes front and rear plates 20a, 20b, respectively, the latter of which is adapted to be firmly secured to plug 18 (as by means of adhesive applied to the abutting faces, for example). The plates 20a, 20b, are maintained in spaced-apart relation by suitable means, such as a plurality of spacers 20r or other conventional means.

Referring now to FIGS. 3 and 4, there is affixed to the interior of shell 14 a longitudinally-extending conductive collector bar or bus 24, which has a ring-like extension 24a disposed transversely of the longitudinally-extending collector portion and serving as a slip ring as will be presently explained. The bus 24 may be affixed to shell 14 in any suitable manner, but as illustrated (FIG. 4) the bus is inserted into a dovetail slot 14q and maintained therein by adhesive for rotation with the shell about the longitudinal axis of the instrument.

Supported between inner fixed support 12 and the rotatable shell 14 for rotation by the latter around the inner support, is a contact-carrying slider 26 (FIGS. 3 and 4), constructed preferably of low-friction synthetic resin or the like. The slider, as indicated in FIG. 3, has a pair of inwardly-extending fins 26b constructed and arranged to fit in the space or groove 16t between adjacent coils of the helical resistance element 16, whereby the slider is guided in a helical path as it is carried or rotated about support 12. As indicated in FIG. 4, the slider 26 is arcuate and elongate, spanning approximately 180° of the periphery of the support; and it is provided adjacent its ends with V-shaped notches 26a, 26b for cooperative driving engagement by complementary longitudinally extending protuberances or V-ways 14p, 14q, provided on the inner wall of shell 14. Thus it is evident that as shell 14 is rotated about the axis of the instrument, slider 26 will be rotated around support 12 and translated therealong in the manner of a nut on a bolt. While fins 26b may be formed on the body of slider 26 at a pitch angle complementary with that of the coil of element 16, it is found that that is unnecessary. As indicated in FIG. 3, the slider is very narrow in cross-section, which contributes materially in space-saving and aids in reduction of the overall dimensions and weight of the device to minimum values. Rocking or sidewise tipping of slider 26 is obviated by the relatively long extent of the slider around support 12.

The slider 26 carries a contact device or member 28 (FIGS. 4 and 7) in a recess 26r therein, the contact being held therein by a pin 26p in a manner made evident in FIG 4. The contact is constructed or formed of resilient electrically conductive material such as a suitable alloy, and is provided with respective outer and inner contact points 28a, 28b adapted for sliding electrical contact with respective ones of bus 24 and the resistive component of resistance element 16. Thus as the slider is traversed along the extent of element 16 in response to rotation of shell 14, the electrical resistance exhibited between slip ring 24a and either of the end portions of element 16 is varied.

As indicated in FIG. 3, there is mounted on the front end portion of support 12 a deformed spring washer 30 constructed and arranged to bear against slip ring 24a and to serve as a brush means for effecting continuous electrical connection between contact bus 24 and a "return" electrical connection provided by an insulated conductor 30c one end of which is attached by fusion, as by brazing to the spring washer. Washer 30 also bears against a shoulder provided by the middle portion of support 12, as indicated. Conductively affixed to respective end portions of the resistive means of helical element 16, as by brazing or welding, are ends of respective insulated electrical connections or leads 16a, 16b. Leads 16a and 16b, and the return connection conductor 30c are disposed in part in a slot 12s (FIG. 3) formed in support 12, and extend therefrom into the bore or passage 10p in supporting stud 10 by way of an elongate aperture 10q formed in support 10. The slot 12s and aperture 10q are, as indicated, disposed in open communication each with the other, to accommodate the several leads. The three insulated conductors or leads 36c, 16a and 16b may pass through the single aperture in the panel P by way of the passage 10p and simply extend out of the open rear end of stud 10 for external connection to associated electrical circuit means, but as illustrated and as preferred, each of the leads is conductively secured to a respective one of a set of J-hook terminals 16e, 16f and 30j. The J-hooks and terminations of the leads thereon are individually insulated by insulated sleeving Is as indicated, and the otherwise unoccupied space within passage 10p is filled with a sealant (potting) compound Pc. Thus the bore of passage may be sealed against ingress of foreign material. To further seal the interior of the instrument against passage of material, an O ring seal 12m is disposed between the rear interior surface of shell 14 and the periphery of flange 12a of support 12, the ring being seated in an annular groove 12g formed in flange 12a. Also the front end of shell 14 is sealed by adhesive applied around the periphery of a transparent "crystal" 32 that is disposed over the front end of shell 14 as indicated in FIG. 3.

Figure 10:
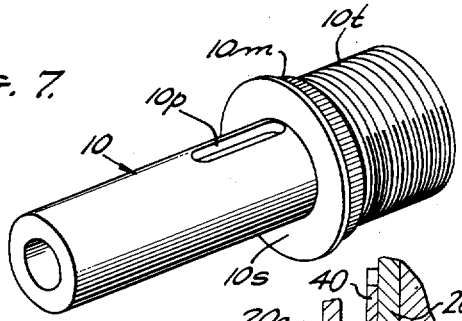
FIG. 10 is an enlarged view of a portion of gearing shown in section in FIG. 3.
Figure 10:
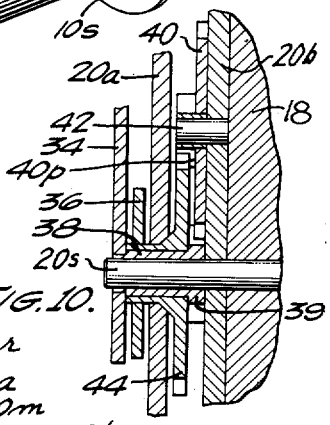

The indicating means for indicating the number of turns or revolutions made by shell 14 and for also indicating fractional parts of a turn thereof, as measured from an initial or "zero" position, are depicted in section in FIG. 3, and are shown in part in the face view of FIG. 1. The indicator means, as will presently be made apparent, furnishes with a determinable degree of accuracy the proportion or percentage of the total resistance of element 16 that is, at any setting of the instrument, exhibited between J-hook (terminal) 30j and a selected one of the other J-hook terminal devices. The indicator means comprises, in addition to previously mentioned plates 20a, 20b, fixed and movable means now to be described. Provided on the front face of plate 20a in an exemplary array as shown in FIG. 1, is a set of indicia including a set of numeric indicia 20i including, in the example, numerals 0, 1, 2 . . . 9, and division points dispersed uniformly between the numerals. Rotatably supported by the previously mentioned locating pin or stud 20s is a fractional-turn indicator pointer 34 the outer end of which engages in a slot 14s (FIG. 3, upper left) formed in the inner periphery of shell 14. See, also FIG. 6. The outer end of the pointer 34 may be made resilient, to accommodate some eccentricity of shell 14 with respect to the axis furnished by pin 20s, and the pointer is constructed and arranged to be driven (rotated) incident to rotation of the shell 14. The inner end of pointer 34 is affixed to the front end of a sleeve hub 38 (FIGS. 3 and 10) that is journaled on pin 20s; and the rear end of hub 38 has affixed thereon a pinion 39. Pinion 39 is meshed with an idler gear 40 that is rotatably mounted on a gudgeon 42 affixed to plate 20b; and gear 40 has affixed thereto for rotation therewith an idler pinion 40p. Idler pinion 40p is meshed with a spur gear 44 which has an elongate hub disposed as indicated for rotation upon hub 38. Gears 39, 40—40p, and 44 are disposed between plates 20a, 20b, and the elongate hub of gear 44 extends forwardly through a central aperture in plate 20a and has affixed thereto for rotation therewith a full-turn indicator pointer 36. The ratios of the gears and the arrangement of indicia 20i will vary according to the number of full turns in the electrically effective portion of resistance element 16. In the illustrative exemplary embodiment of a potentiometric device according to the invention, there are ten turns of effective extent of element 16, and accordingly the numeric indicia provide for ten divisions in the "dial" (plate 20a) of the indicating means; and the gearing ratios are such that one complete revolution of driving pointer 34 causes rotation of pointer 36 through one-tenth of one revolution.

Figure 9:
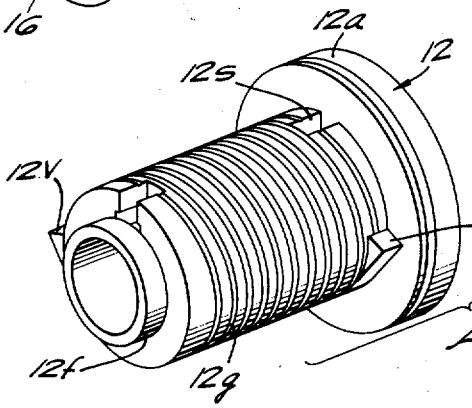
FIG. 9 is a representation of components of the device depicted in FIGS. 1–4, in disassembled relation.

For defining terminal limits of rotational traverse of the contact-bearing slider 26, and to prevent damage to the instrument incident to attempted operation of the contact beyond the effective end of resistance element 16, end stops 12u and 12v (FIGS. 4 and 9) are provided at the rear and forward ends, respectively, of the middle portion of support 12. The stops may be suitably affixed to support 12 or, preferably and as shown, may be formed as integral portions of the support. The stops are constructed and arranged to be engaged by respective beveled edge surfaces 26f, 26e formed at opposite ends of slider 26, as indicated in FIG. 4. It will be evident that as the slider progresses through the terminal revolution at either end of its traverse along the resistance element 16 it will be translated endwise of support 12 and into position to be positively stopped by engagement or collision with the adjacent one of stops 12u, 12v. The angular arrangement of the coacting surfaces (26f and 12u, for example) is such that a camming effect is produced as the slider collides with the stop. The camming tends to force the end portion of the slider outwardly against the adjacent interior surface of shell 14; and as the end of the slider is thus forced outwardly, a reverse or opposing cam action occurs between coacting surfaces at V-notch 26a and ridge 14p, for example, whereby the end portion of the slider between the V-notch and the beveled end surface is subjected to compressive forces. Thus the end portion is pressed outwardly against the interior surface of shell 14, providing a brake-like locking effect, and is concurrently subjected to direct compression. Also the force directed against the stop is substantially perpendicular to the contact-face and is directed toward and through a relatively massive portion of the support. Thus any tendency to shear any portion of the motion-limiting structures is reduced to insignificance, whereby breakage due to attempted overrunning of the slider is prevented and a positive end-position (starting position) of the slider is permanently established.

From the preceding description it is evident that the support 12 and the stud 10 form an excellent heat-conductive path from element 16 to the panel on which the instrument is considered to be mounted. This feature permits the potentiometric device to be assigned a higher operating rating and temperature, relative to those potentiometer devices in which the heat must be conducted through the outer shell of the device. Since the element is wound upon the exterior of the support 12 prior to being covered by application of the shell or cover 14 and the indicator, winding of the element and inspection and calibration of the wound resistance are greatly facilitated. Likewise, application of terminal leads and the other electrical connections and application of potting compound are made easy and simple. Due to the slider being elongate as explained, it may be made very narrow, which permits enclosing the operating parts in a shell or "knob" of relatively short length, with attendant saving in space. Since the leads or terminals extend through the hollow mounting stud, only one aperture need be formed in a panel; and due to the milling of the support, a firm fit in a panel is attained. Also, with the leads extending through a hollow stud, sealing of the device against passage of material into the working parts is greatly facilitated, mere potting of the leads and application of an O-ring sufficing. The indicator means is such as to indicate not only the number of turns made by the contact along the resistance element from a reference end thereof, but also is such as to accurately indicate small fractional portions of a turn, greatly facilitating exact adjustment and readjustment of the device. Since the indicator is direct-connected to the shell or actuating member which in turn actuates the slider, all back-lash effects are substantially eliminated. Due to the elongate double-finned construction of the slider, wear effects caused by operation (adjustment) of the device are minimized. Also, due to the unique construction of the stops on the element support and the cooperative parts of the slider and the shell, breakage of parts due to attempted overrun of the device is substantially impossible. Thus it is evident that the aforestated objects of the invention have been fully met.

Figure 12:
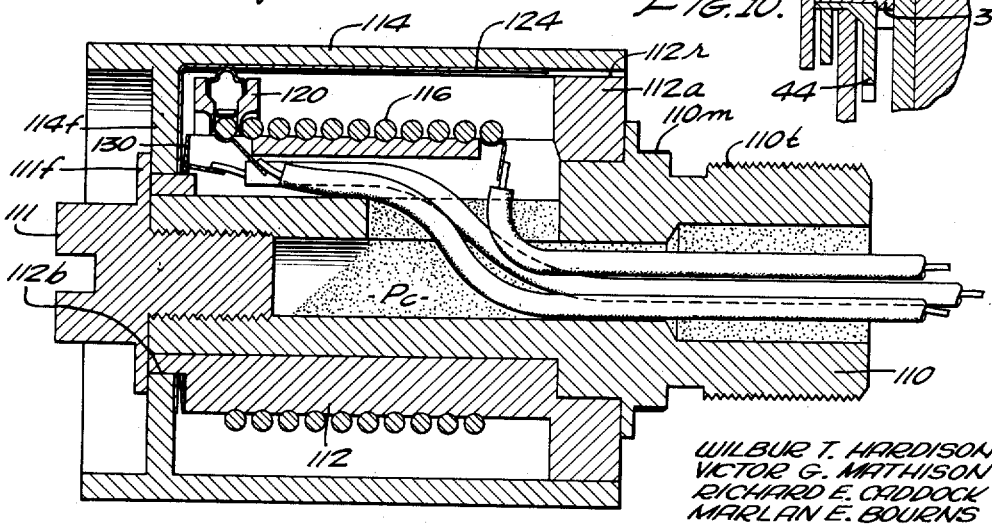
FIG. 12 is a view similar to FIG. 2, illustrating a modified form of potentiometric device according to the invention.

In FIG. 12 there is illustrated a modified form of potentiometer device according to the invention, in which form of the device no indicator means are provided. Since mounting details of the illustrated modified form are similar to those of the previously described principal embodiment or form, description of the modified form will be limited to those features in which there is marked difference. As indicated in FIG. 12, the supporting stud 110 is formed and internally threaded to receive at its forward end a threaded cap screw 111 that is provided with a retainer flange 111f. The outer rotatable knob or shell 114 is provided with an inwardly extending internal flange 114f that is bored or formed to fit rotatably on surface 112b of support 112, and to cooperate with flange 111f of the cap screw to retain the shell in position on the instrument. The rear end of shell 114 is rotatably supported by a complementary cylindric bearing surface 112r formed on the periphery of the rear flange 112a or support 112. A slight extent of end-play is permitted between the support 112 and retainer flange 111f of cap screw 111; but this is insufficient to affect operation of slider 120 and is normally taken up by the action of brush washer 130 in an evident manner. In the modified and simpler form of instrument illustrated in FIG. 12, sealing means and indicator means are omitted. In respects other than as noted that instrument may be substantially like that herein previously described and illustrated in FIGS. 1–11, inclusive, with components bearing numbers of their counterparts increased by one hundred.

Having described in detail a preferred but exemplary physical embodiment of a variable resistor device embodying the principles of the invention, it is evident that in the light of that disclosure various modifications and variations will occur to those skilled in the art, and hence we do not wish to be limited to the details of the illustrative preferred embodiment described, but we claim:

1. Variable resistor means comprising:

first means, comprising supporting means, constructed and arranged to be supported on a panel by insertion through an aperture in the panel and adapted to be secured thereto by clamping action on opposite sides of the panel, said supporting means comprising a stud having a passage extending through at least that portion of the supporting means that is adapted to extend through the panel;

second means, comprising a generally cylindrical rotatable shell having means defining an axis with the shell mounted upon and adapted for axial rotation upon said first means at the front of the panel;

third means, comprising first and second potentiometer components disposed within said rotatable shell, said components comprising a compound helical resistance element and a contact device and one component movable relatively to the other incident to rotation of said shell and a first of said components being affixed to said first means and the second component being arranged for coactive relative movement with respect to the first of the components by rotation of said shell; and fourth means, comprising electrical connection means including a plurality of electric conductors electrically connected respectively to said contact device and first and second end portions of said resistance element and extending through said passage for access at the rear of the panel.

2. Variable resistor means according to claim 1, including indicator means supported on said first means and comprising a rotatable indicator device operable by rotation of said rotatable shell for rotation thereby incident to rotation of said shell, whereby the extent of relative movement of said components is indicated by said indicator means.

3. Variable resistor means according to claim 2, said resistance element being a helical formation of spaced-apart convolutions of resistive material, the element being affixed to said first means, and said contact device comprising an insulative slider and a conductive contact element arranged in contact with said resistance element and supported on the slider for movement therewith, said slider and said shell having coacting portions for movement of the slider along said resistance element incident to rotation of said shell.

4. A miniature potentiometer comprising:

first means, including stud means constructed and arranged for mounting in an aperture of a mounting panel, said stud means having a passage therethrough in the region adapted to extend through a panel, said first means including a support means secured upon said stud means and having thereon a compound helical resistance element;

second means, including a knob means comprising a generally cylindrical rotatable shell, rotatably mounted on said support means and enclosing said support means and said resistance element;

third means, comprising contact and contact-carrying slider means disposed between said support means and said knob means and constructed and arranged to be driven by said knob means and traversed along an extent of said resistance element incident to rotation of said knob means, said contact being in electrical contact with said resistance element;

and fourth means, comprising electrical connections connected to end portions of said resistance element and to said contact, respectively, and extending through said passage for extending to the rear of the panel.

5. A miniature potentiometer according to claim 4, including fifth means, said fifth means comprising dial-indicator means at the face of and driven by said knob means incident to rotation of the latter, and constructed and arranged to separately indicate full turns of traverse and fractional turns of traverse of the said contact along the extent of the said element from one electrical end of said element.

6. Potentiometric means, comprising:

first means, including a stud having a rear-end portion adapted to extend through an aperture in a panel for attachment of the stud to the panel, said stud having a front-end portion adapted to extend forwardly from the front face of the panel, said stud having means providing a passage extending through the rear-end portion into and exposed at the exterior of the front-end portion, and said first means including a generally cylindric insulative support means fixedly mounted on the front-end portion of said stud and having front and rear bearing surfaces;

second means, comprising a helical resistance element affixed to said insulative support means, and electrical leads connected to respective end portions of said element and extending through said passage and out of the rear-end portion of said stud;

third means, comprising a rotatable cylindrical shell having surfaces bearing on said front and rear bearing surfaces, respectively, of said support means, and arranged to enclose said element and said support means, said third means comprising an electrical bus-and-slip-ring device affixed to said shell and rotatable therewith, electrical brush means contacting said slip ring device, and a conductive lead extending through said passage and connected to said brush means;

fourth means, comprising a thin elongate arcuate slider disposed between said shell and said element, said slider engaging and driven around said support means and along said element by said shell incident to rotation of the shell, said slider comprising resilient contact means arranged to contact and electrically connect said element and said bus-and-slip-ring device, said slider having a pair of inwardly extending arcuate flanges extending between convolutions of said resistance element and thereby serving to traverse said slider longitudinally of said support means incident to rotation of said shell;

and fifth means, comprising full-turn and fractional-turn indicator means disposed in the front end of said shell and supported by said stud and connected to and actuated by said shell incident to rotation of the latter.

7. Potentiometric means according to claim 6, including means constructed and arranged to seal the interior of said shell against ingress of foreign matter.

8. Potentiometric means according to claim 7, including cooperating stop means on respective opposite ends of said support means and on said slider, constructed and arranged to arrest movement of said slider when said contact means reaches either electrical end of said resistance element.

9. Potentiometric means according to claim 8, said indicator means comprising a base supported by said stud means, gearing supported by said base, a full-turn indicator hand supported and driven by said gearing, a partial-turn indicator hand connected to said gearing and engaged by said shell to be driven by the latter, and indicia-bearing dial means disposed for cooperation with said indicator hands for providing an indication of the position of said contact along the extent of said resistance element.

10. In a rotary potentiometer having a compound helical resistance element disposed upon a stationary generally cylindrical support, the combination with said element and said support, comprising: a generally cylindrical rotary shell substantially enclosing said element and said support and rotatable on said support;

a narrow elongate arcuate slider disposed between said shell and said support and engaging said shell for rotation therewith around said support, said slider comprising inwardly-extending flanges disposed between convolutions of said helical element for guiding the slider along the element incident to rotation of the slider by said shell;

contact means carried by said slider and arranged to brush on said element;

and means forming electrical connections to end portions of said element and to said contact.

11. The combination defined by claim 10, said support comprising stop means at respective ends thereof constructed and arranged to engage and limit movement of said slider in either direction along said resistance element.

12. A potentiometer comprising:

first means, comprising relatively fixed means including a portion adapted to be secured to a panel, and including an elongate generally cylindric support provided with stop-abutments, and a bus;

second means, comprising a compound helical resistance element supported by the said generally cylindric support on the exterior thereof, and comprising a rotary device and a contact carried by the rotary device and arranged to electrically connect said bus and said resistance element, said rotary device being narrow and arcuate and having ends formed to collide with said stop-abutments;

third means, comprising electrical connections to said bus and to end portions of said resistance element; and fourth means, comprising generally cylindric rotatable shell means encircling and engaging said rotary member for rotating the latter to traverse said contact along an extent of said resistance element to vary the resistance exhibited between said bus and either end portion of said resistance element.

13. In a potentiometer:

first means, comprising a generally cylindric support means, and a compound helical resistance element on said support means, said support means comprising first and second stop-abutment means adjacent respective end-portions of said helical resistance element;

second means, comprising rotary means including arcuate rotary slider means and rotary hollow shell means enclosing said support means and said slider means, said shell means and said slider means having interengaging key and keyway means for driving the slider means, and said slider means having first and second end portions formed to engage and cooperate with respective ones of said stop-abutment means and further comprising electric contact means arranged to wipe on said element; and third means, comprising electrical means forming connections to said contact means and to end portions of said helical resistance element.

14. In a potentiometer comprising relatively stationary support means and a compound helical resistance element supported by the support means and having electrical connections to the resistance element, the combination therewith comprising:

first means, comprising a rotary device arranged for rotary movement relative to said support means, and including a contact carried thereby in contact with said element to wipe along a plural-turn extent of the latter incident to rotation of the device;

second means, comprising a rotary shell, supported for rotation by the support means and engaging said rotary device for imparting rotary movement thereto incident to rotation of the rotary shell, said shell substantially enclosing said element and said rotary device;

third means, comprising dial means and gearing means secured for support by said support means, said third means comprising first and second indicator limbs cooperative with said dial means and intercalated by said gearing means to rotate concurrently but at respective first and second rates, and said first indicator limb engaging said shell to be rotated thereby, whereby said third means is operated concurrently with said rotary device to provide a sense-perceptible indication of the full turns and fractional turns of movement of said rotary device along said resistance element.

15. Variable resistor means comprising:

first and second means, one relatively fixed and defining an axis and the other rotatable about the defined axis;

helical resistance-element means supported by one of said means, and a device including a contact adapted to wipe on said resistance element, said device engaging the movable one of said first and second means for rotational movement thereby to wipe said contact along said resistance element, and said device being of elongate arcuate configuration complementary to a partial-turn of said helical resistance element and having cam surfaces at respective first and second ends thereof;

and first and second stop abutment means on one of said first and second means and arranged for camming engagement by a respective one of said cam surfaces on said device to cause said device to be frictionally jammed between said first and second means incident to engagement of one of said abutment means by one of said cam surfaces on said device, whereby rotational movement of said device is limited.

16. Variable resistor means comprising:

first and second means, one relatively fixed and defining an axis and the other rotatable about the defined axis;

compound helical resistance-element means supported by one of said first and second means;

means, including a rotatable device disposed between said first and second means and engaging the rotatable one of the said first and second means for rotation thereby around said axis, said rotatable device comprising contact means arranged to wipe on an extent of said resistance element incident to rotation of said device;

other means, comprising respective electric connections to at least one end portion of said element and to said contact means;

and indicator means, supported by one of said first and second means and engaged by the other thereof for operation thereby incident to relative rotation between said first and second means, said indicator means comprising a dial disposed coaxial with said defined axis and a fractional-turn limb and a full-turn limb, aranged to provide an indication of the position of said contact means along the said extent of said resistance element.

17. Variable resistor means according to claim 16, said first means being relatively fixed and said second means comprising a rotatable shell enclosing said resistance element, and said shell engaging said frictional-turn limb to rotate the latter.

18. For use in a potentiometer, the combination comprising:

first means, comprising a generally cylindrical support means, said support means comprising first and second stop-abutments adjacent respective ends thereof;

second means, comprising a compound helical resistance element supported by said first means and arranged in spaced-apart convolutions about said support means and between said stop-abutments;

third means, comprising a narrow elongate and arcuate slider constructed and arranged to straddle a partial-convolution of said element and having inwardly projecting flanges fitting between adjacent convolutions of said element, said slider having a contact engaging said element and having end-surfaces disposed for engagement with said stop-abutments for arresting rotary movement of said slider at the ends of said support means;

and fourth means, including rotary generally cylindric shell means constructed and arranged for rotation relative to said support means and for engaging and rotating said slider.

19. The combination defined in claim 18, said rotary means comprising a shell rotatably mounted on said cylindrical support and enclosing said element, said shell and said slider having complementary interengaging V-way means for rotation of the slider by the support.

20. A potentiometer comprising:

first means, comprising a stud adapted to be affixed to a panel, said first means defining an axis;

second means, comprising a hollow shell means, constructed and mounted for rotational movement on said first means;

third means, comprising first and second electrical components including a compound helical resistance element and a contact, said first and second electrical components being disposed for relative rotation and arranged between said first means and said second means for relative movement by said shell means;

fourth means, comprising dial indicator means supported by said first means and including first and second indicator limbs and a dial therefor, said first indicator limb engaging said shell means for rotation therewith and thereby, and said indicator means being constructed and arranged to indicate relative positions of said first and second electrical components; and fifth means, comprising electrical connections to end portions of said resistance element and to said contact.

21. A potentiometer according to claim 20, said stud having a passage extending through a portion thereof adapted to extend through a panel, and said electrical connections comprising insulated conductors extending through said passage.

22. For a potentiometer having a long resistance element of helical form with convolutions of the element in spaced-apart relationship to provide a helical groove therebetween, a slider means adapted to be guided by said element and a contact member mounted on the slider for wiping contact along the convolutions of said element, said slider comprising a long narrow arcuate body having opposed elongate arcuate fins constructed and arranged to slide in the helical groove between adjacent convolutions of said element and be guided thereby, said body having a portion interconnecting said fins and arranged to straddle an extensive arcuate portion of a convolution of said element, and said contact being arranged to wipe on the straddled portion of a convolution of said element, the arcuate extent of said slider means being sufficient to obviate tumbling of said slider means in such potentiometer.

23. A knob-enclosed multi-turn potentiometer adapted to be mounted on the face of a panel and having a generally cylindric stationary structure having a tubular rear end-portion adapted to extend through a mounting hole in such panel for attachment of the stationary structure to the panel, said potentiometer including in combination with said stationary structure:

first means, comprising a compound helical resistance element secured on a middle portion of said stationary structure, and terminal leads connected to end portions of said resistance element and extending through the interior of said tubular portion to the exterior at the back end thereof;

second means, comprising a generally cylindric shell rotatably mounted on said stationary structure and enclosing a space therebetween;

third means, comprising contact and slider means disposed in said space and engaging said shell for rotation thereby around said stationary structure with said contact in wiping contact with said element, and electrical return means for said contact; and fourth means, comprising a clock-like dial-and-indicator means secured to the front end portion of said stationary structure and comprising gearing and a full-turns indicator limb and a fractional-turn indicator limb geared together, and said fractional-turn limb being connected to said shell to be rotated thereby to indicate extent of rotation of the shell, said indicator means comprising an indicia-bearing dial of diameter of the order of the diameter of said shell whereby said limbs and dial provide an indication of the extent of rotation of said knob of maximum legibility.

24. In a potentiometer having a compound helical resistance element, the combination therewith comprising:

first means, comprising stationary means upon which said resistance element is mounted;

second means, comprising a rotatable generally cylindrical shell means mounted for rotation around said stationary means;

third means, comprising an arcuate contact-carrying slider adapted to straddle and slide along an extent of said resistance element by rotation about said stationary means with concurrent translation therealong, said slider and said rotatable shell means having interengaging means for inducing movement of said slider about said stationary means incident to rotation of said shell means;

and fourth means, comprising electrical connections to said resistance element and the contact carried by said slider.

*25. Variable resistor means comprising:*

*first means, including supporting means, constructed and arranged to be attached to and supported on a panel by insertion of a portion thereof through an aperture in the panel and adapted to be secured thereto by clamping action on opposite sides of the panel, said supporting means comprising a stud having a passage extending through at least that portion of the supporting means that is adapted to extend through the panel, and said supporting means comprising means for securing said portion thereof to said panel at the said aperture;*

*second means, comprising generally cylindrical rotatable shell means comprising means defining an axis with the said shell mounted upon and adapted for axial rotation upon said first means forwardly of the panel;*

*third means, comprising first and second potentiometer components disposed within the said rotatable shell means, said components comprising a helical resistance element of at least several convolutions, disposed with its axis substantially coaxial with the said axis defined by the said rotatable shell means and the said convolutions being axially spaced apart, and said components also comprising a contact device including a contact disposed in electrical contact with said resistance element, and one of said components being connected to said first means and thereby restrained against rotation around the said axis and the other of said components being connected to said rotatable shell means whereby one of said components is movable relatively to the other thereof incident to rotation of said shell means to thereby*

*change the resistance exhibited between the said contact and either end of said resistance element; and*

*fourth means, comprising electrical conductor means providing respective conductive connections to said contact device and to first and second end portions of said helical resistance element, said electrical conductor means including respective portions extending through said passage in said stud whereby to provide electrical connections to said potentiometer elements, accessible at the rear of the panel.*

*26. A helical-element knob-enclosed variable resistor comprising:*

*first means, including supporting means, constructed and arranged to be attached to and supported on a panel at an aperture in the panel and to provide a support forwardly of the panel, said supporting means comprising a stud having a portion arranged to extend through such aperture to the rear of the panel and means to affix the stud to the panel, said stud having a plurality of insulated conductors extending therethrough in said portion and said supporting means including means forming bearing means disposed forwardly of said portion of said stud so as to be in front of the panel;*

*second means, comprising generally cylindrical shell means, rotatable on said bearing means and having means defining an axis, said first means and said second means providing an enclosed space therebetween;*

*third means, comprising potentiometer parts disposed within said rotatable shell means in said enclosed space, said parts including a helical resistance element of at least several spaced-apart convolutions disposed about said axis, and said parts including a contact-carrying slider having a contact arranged in electrical contact with said resistance element, one of said parts being connected to said first means and being thereby restrained against rotation around said axis and the other of said parts being connected to said second means for rotation therewith about said axis, whereby incident to rotation of said shell means about said axis the effective resistance between said contact and an end of said element is changed; and*

*fourth means, comprising conductive connections between two of said insulated conductors and respective end portions of said resistance element, and conductive means providing electrical connection of said contact to another of said insulated conductors,*

*whereby said helical-element knob-enclosed variable resistor means may be disposed at and operated from in front of the panel and electrical connections thereto are accessible at the rear of the panel.*

References Cited in the file of this patent or the original patent

UNITED STATES PATENTS

| | | |
|---|---|---|
| 1,693,009 | Warner | Nov. 27, 1928 |
| 2,371,159 | Erb | Mar. 13, 1945 |
| 2,399,060 | Peurner | Apr. 23, 1946 |
| 2,494,998 | Guller | Jan. 17, 1950 |
| 2,539,575 | George | Jan. 30, 1951 |
| 2,558,326 | Van Dyke | June 26, 1951 |
| 2,883,501 | Paget | Apr. 21, 1959 |
| 2,884,506 | Graustein | Apr. 28, 1959 |
| 2,953,762 | Deniston | Sept. 20, 1960 |